(12) United States Patent
Moreaux

(10) Patent No.: US 6,497,370 B1
(45) Date of Patent: Dec. 24, 2002

(54) INPUT CIRCUIT FOR MEMORY SMART CARDS

(75) Inventor: Christophe Moreaux, Eguilles (FR)

(73) Assignee: STMicroelectronics S.A., Gentilly (FR)

( * ) Notice: Subject to any disclaimer, the term of this patent is extended or adjusted under 35 U.S.C. 154(b) by 57 days.

(21) Appl. No.: 09/668,240

(22) Filed: Sep. 20, 2000

(30) Foreign Application Priority Data

Sep. 28, 1999 (FR) .............................................. 99 12327

(51) Int. Cl.[7] .............................................. G06K 19/06
(52) U.S. Cl. ........................ 235/492; 235/451; 235/487; 235/380
(58) Field of Search .................. 235/451, 487, 235/492, 380

(56) References Cited

U.S. PATENT DOCUMENTS 4,256,955 A  *  3/1981 Giraud et al. ................ 235/380
4,654,829 A  *  3/1987 Jiang et al. ............ 365/189.03
5,396,056 A  *  3/1995 Yamaguchi .................. 235/439
5,737,571 A      4/1998 Fukuzumi .................... 395/479
6,027,029 A  *  2/2000 Kim ............................ 235/492

FOREIGN PATENT DOCUMENTS

| EP | 0 362 050 | 4/1990 | .......... G06K/19/06 |
| JP | 403071289 A | * 8/1989 | ................. 235/487 |
| JP | 405250531 A | * 3/1992 | ................. 235/492 |

* cited by examiner

Primary Examiner—Michael G. Lee
Assistant Examiner—Steven S. Paik
(74) Attorney, Agent, or Firm—Lisa K. Jorgenson; Allen, Dyer, Doppelt, Milbrath & Gilchrist, P.A.

(57) ABSTRACT

An input circuit for memory integrated circuit cards receives a first binary signal transmitted by direct contact between the card and a reader and produces a write control signal that depends on the first binary signal to control a memory. The input circuit includes a control circuit to verify the voltage level of the first binary signal and produce a validation signal, and an inhibition circuit to inhibit the write command when the validation signal is inactive.

26 Claims, 3 Drawing Sheets

INPUT CIRCUIT FOR MEMORY SMART CARDS

FIELD OF THE INVENTION

The present invention relates to smart cards, and more particularly, to an input circuit for smart cards having an electrically erasable and programmable memory (EEPROM).

BACKGROUND OF THE INVENTION

Smart cards having an EEPROM, such as phone cards, are well known and commonly use a low-capacity memory of about 300 bits. A part of the memory contains, for example, codes identifying the card and/or its proprietor and/or its manufacturer. Another part of the memory may contain a unit counter, which is the case especially with phone cards.

The addressing of the memory, namely the read and/or write operations, is done sequentially. Three commands are usually enough to manage a memory of this kind. A shift and read command RE shifts the operation from one memory cell to the next memory cell so that the contents of the latter cell can be read. A write command WR is used to program the memory cell in which the operation is located. Finally, an initialization command RST is used to initialize the commands of the memory, namely to take position on the first cell of the memory pending an instruction.

Thus, to program the nth memory cell, the following commands are performed successively: an initialization command RST to take position on a first memory cell, (n−1) shift and read commands RE to take position on the nth memory cell, and finally a write command WR to program the nth cell. If several cells of the memory have to be programmed successively, then to limit the number of commands to be performed, the shift and read commands RE and the write command WR could be sequenced without necessarily and systematically carrying out a performance of an initialization command RST after each write command WR. However, the instructions have to be communicated with care by the reader. Indeed, the involuntary programming of certain cells of the memory may put the card out of operation and thus make it unusable. In the prior art, the shift and read command RE, the write command WR and the initialization command RST are encoded in the form of two binary data elements A and B and transmitted to the card in the form of two binary signals SA, SB. These binary signals SA, SB are transmitted by direct contact between output terminals of the reader and corresponding input terminals of the card. For example, the initialization command RST is encoded by A=0 and B=0, the shift and read command RE is encoded by A=0 and B=1 and the write command WR is encoded by A=1 and B=1, the combination A=1 and B=0 being unused.

An input circuit, internal to the card, receives the two binary signals SA, SB and gives the shift and read command RE and/or write command WR and/or initialization command RST to the memory. FIG. 1 shows a conventional structure of an input circuit 100 of this kind comprising five input terminals 101 to 105 to which there are respectively applied the first binary signal SA, a clock signal CLK, the second binary signal SB, a power supply voltage Vcc and a power-on signal POR. To each input terminal of the circuit 100, there corresponds an output terminal of a reader 150. Brushes located on the output terminals of the reader 150 provide the contact with the input terminals of the card when it is inserted into the reader.

The input circuit has a first read circuit 110, a second read circuit 120, and a decoding circuit 130. The supply voltage Vcc powers all the elements of the input circuit 100. The first read circuit 110 has a comparator 115 and a flip-flop circuit 116. The comparator 115 has an input terminal known as a positive (+) terminal connected to the input terminal 101 of the input circuit 100 and an input terminal known as a negative (−) terminal to which a first reference voltage V1 is applied. The comparator 115 also has an output terminal connected to a D input terminal of the flip-flop circuit 116 whose clock input and initialization terminals are connected respectively to the input terminals 102 and 105 of the input circuit 100.

The first read circuit 110 works as follows. The comparator 115 compares the voltage level of the signal SA applied to its positive input terminal (+) with the first reference voltage V1 and gives the result of the comparison at the D input terminal of the flip-flop circuit 116 in the form of a binary data element A. During an active edge of the clock signal CLK, the flip-flop circuit 116 transmits the data element A to its Q output terminal. The binary data element A is for example equal to "1" if the voltage level of the binary signal SA is higher than the first reference voltage V1. If not, it is equal to "0". Similarly, the second read circuit 120 has a comparator 125 with a positive input terminal (+) connected to the input terminal 103 and a negative input terminal (−) to which there is applied the first reference voltage V1. The comparator 125 also has an output terminal connected to a D input terminal of a flip-flop circuit 126 whose clock input and initialization terminals are connected respectively to the input terminals 102 and 105 of the input circuit 100. The second read circuit 120 works similarly to the first read circuit 110: it receives the binary signal SB and produces a binary data element B representing the level of the binary signal SB with respect to the first reference voltage V1. The binary data element B is for example equal to "1" if the level of the binary signal SB is higher than the reference voltage V1. If not, it is equal to "0".

By design, the comparators 115 and 125 have a hysteresis threshold ranging from a voltage threshold VH of about 2 V to a voltage threshold VL of about 0.8 V. To obtain efficient operation of the comparators 115, 125, preferably a first reference V1 ranging between the threshold voltages VL and VH will be chosen. It should be noted that the flip-flop circuits 116, 126 are not indispensable to the working of the read circuits 110, 120. They simply synchronize the binary data elements A, B arriving at the decoding circuit 130.

The decoding circuit 130 has two input terminals 131, 132 respectively connected to Q output terminals of the flip-flop circuits 116 and 126. At three output terminals 135 to 137, the decoding circuit 130 produces the three signals, namely the shift and read control signal RE, the write signal WR and the initialization signal RST which are applied to the memory 140. With an input circuit of this kind, an instruction given by the reader is thus interpreted by decoding the logic state of the binary signals SA, SB received at the input terminals 101 and 103.

However, the card must be protected against involuntary programming of certain cells of the memory, or else the smart card will be destroyed. For example, when the card is not being used and its input terminals are left floating, the read circuits 110, 120 should not be capable of giving the combination A=1 and B=1 which corresponds to the write command WR.

For this purpose, a protection device may be added to the input circuit which favors a particular combination when the input terminals of the card are left floating, for example A=0 and B is equal to any value, or else A=1 and B=0 which corresponds to the shift and read command. The state A=1 and B=1 corresponding to a write command is thus prevented when the card is unused and the risks of involuntary programming of the card are minimized.

The protection device may for example be a parallel resistor ra such as the one shown in FIG. 1, an input terminal of the resistor $r_a$ being connected to the input terminal 101 and its other terminal being connected to the ground. Thus, when the input terminal 101 is left floating, the first read circuit 110 gives the binary data element A=0. The protection device may also comprise a resistor $r_b$ as shown in dashes in FIG. 1, which comprises an input terminal connected to the input terminal 101 and another terminal to which the supply voltage Vcc is applied. When the input terminal 101 is left floating, then the first read circuit 110 gives the data element A=1. In this case, care will then be taken to add a resistor $r_c$, connected between the input terminal 103 and the ground, to the protection device to ensure B=0 and thus prevent the combination A=1 and B=1 corresponding to a write command.

The adding of a protection device thus removes the risk of the involuntary programming of the memory of the card when this card is not used. However, the smart cards often operate in difficult environments and the involuntary programming of certain cells of the memory can also occur with a circuit such as the one of FIG. 1, during the use of the card. Such errors of interpretation of instructions appear especially when the contacts between the output terminals of the reader and the corresponding input terminals of the card are of poor quality, when a brush of the reader is defective or else, more frequently, when a contact is slightly oxidized. Indeed, it has been observed that when a contact is poor, a write command WR may be interpreted as a shift and read command RE. Or, conversely, a shift and read command may be interpreted as a write command WR, the consequence of which is an involuntary programming of a cell of the memory and a risk that the card will become incapable of operating.

SUMMARY OF THE INVENTION

To eliminate the risk of the card being put out of order through poor contact between the card and the brushes of the reader, the invention provides an integrated circuit card comprising an input circuit and a write accessible memory, the input circuit receiving a first binary signal transmitted by direct contact between the card and a reader and producing a write control signal that is dependent on a first binary data to control the memory. The input circuit includes a first comparator that receives the first binary signal and produces the first data element representing the voltage level of the first binary signal with respect to a first reference voltage, and a control circuit that receives the first binary signal and produces a validation signal that is inactive if the voltage level of the first binary signal is between the first reference voltage and a second reference voltage that is below the first reference voltage. The validation signal is active if the level of the first binary signal is higher than the first reference voltage or if it is lower than the second reference voltage. Also, an inhibition circuit inhibits the write control signal when the validation signal is inactive.

Preferably, the first comparator comprises a positive input terminal to which the first binary signal is applied and a negative input terminal to which the first reference voltage is applied, the first comparator giving the first data element at an output terminal, the first data element being in a first logic state if the level of the first binary signal is higher than the first reference voltage and being, if not, in a second logic state. The control circuit comprises a second comparator comprising a positive input terminal to which the first binary signal is applied and a negative input terminal to which the second reference voltage is applied. The second comparator gives a second data element at an output terminal, the second data element being in the first logic state if the level of the first binary signal is higher than the second reference voltage and being, if not, in the second logic state. Also, a first logic gate includes two input terminals connected respectively to the output terminals of the first and second comparators and an output terminal to give the validation signal. The validation signal is active if the first and second data elements are in the same logic state, the validation signal being inactive if the first and second data elements are in different logic states.

Preferably again, the control circuit furthermore comprises a flip-flop circuit to store and produce the validation signal when an active edge of a clock signal is received and a second logic gate to keep the validation signal inactive. The flip-flop circuit comprises a D input terminal connected to an output terminal of the second logic gate, a clock input terminal to which the clock signal is applied, an initialization input terminal and a Q output terminal to give the validation signal. The second logic gate has two input terminals respectively connected to the output terminal of the logic gate and to the Q output terminal of the flip-flop circuit.

According to one embodiment, the input circuit also receives a second binary signal and produces a shift and read control signal and an initialization control signal each depending on the first and second binary signals. Preferably, the control circuit in this case comprises a third logic gate to make the validation signal active when a power-on signal is received or when the initialization control signal is produced by the input circuit. The third logic gate comprises two input terminals to which the power-on signal and the initialization control signal are applied respectively, and an output terminal connected to the initialization input terminal of the flip-flop circuit.

According to one embodiment, the inhibition circuit comprises a fourth logic gate comprising two input terminals to which there are respectively applied the write control signal and the validation signal. The fourth logic gate also comprises an output terminal to give either the write control signal if the validation signal is active or a zero control signal if the validation signal is inactive.

Preferably, the integrated circuit card furthermore comprises an output terminal to give the validation signal to the reader of the card. Preferably finally, the integrated circuit card has a protection device comprising a first resistor and a second resistor, the first resistor being connected between the input terminal and the ground, the second resistor being connected between the input terminal and the supply input terminal.

The invention thus proposes to deactivate the functioning of the card, and especially any write operation, if the level of the first binary signal is in a zone of uncertainty ranging between the first and second reference voltages. Indeed, if the level of the first binary signal ranges from the first reference voltage to the second reference voltage, it is considered to be the case that there may be a doubt on the voltage level of the first binary signal received, because its level does not correspond to the level that the reader has truly applied (in the case of poor contact). In this case, the voltage level of the first binary signal is deemed to be incapable of being read and interpreted accurately by the input circuit and it is considered in this case to be preferable to turn the circuit off. For this purpose, the control circuit of the invention produces an inactive validation signal which places the card in off mode and makes the control signals, especially the write control signal, inactive by means of the inhibition circuit. No write operation can take place thereafter. This removes the risks of invalidation of the card due to poor contact, during the use of the card.

The reader then reports an anomaly to the user and suggests that he should remove his card and, if necessary, reinsert it. If the non-functioning of the card is due only to poor contact between the card and the reader, it often suffices to remove the card and then reinsert it into the reader one or more times, if necessary in order to rid the contacts of the fine oxide layer that covers them. The card is therefore no longer non-functional because of poor contact and can be reused.

Conversely, if the voltage level of the first binary signal is higher than the first reference voltage or lower than the second reference voltage, it is deemed to be the case that is no doubt about the voltage level of the first binary signal. In this case, the control circuit produces an active validation signal. The input circuit then works in a standard way.

BRIEF DESCRIPTION OF THE DRAWINGS

The invention will be understood more clearly and other features shall appear from the following description, made with reference to the appended drawings, of which.

DETAILED DESCRIPTION OF THE PREFERRED EMBODIMENTS

Figure 1:
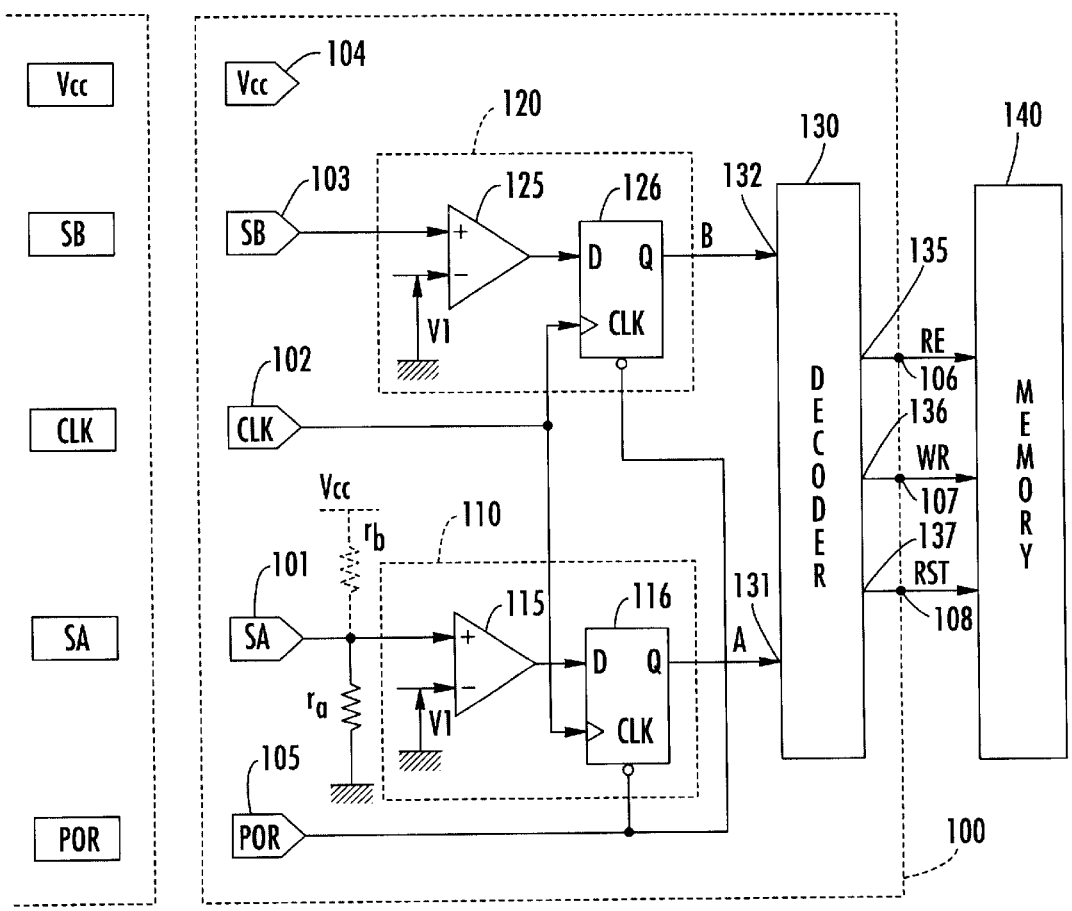
FIG. 1 is a schematic diagram of an input circuit for memory integrated circuit cards according to the prior art.
Figure 2:
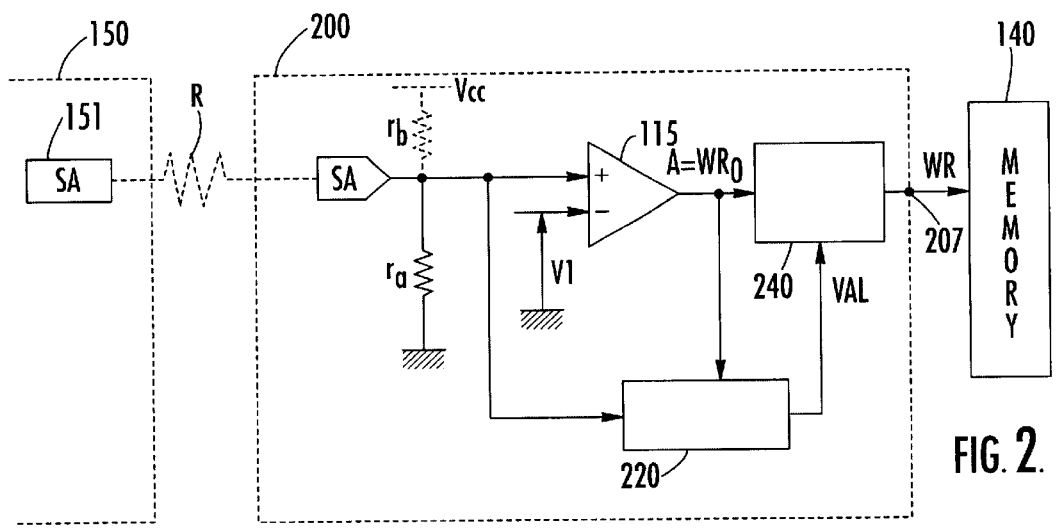
FIG. 2 is a schematic diagram illustrating the principle of the invention.

FIG. 1 shows a view of the prior art and has been described already. The elements of FIGS. 2, 3, and 4 and those of FIG. 1 having the same references are substantially identical. FIG. 2 is a schematic diagram illustrating the principle of the invention, applied to a simplified input circuit 200. A simplified input circuit 200 of this kind could be used for example in a memory smart card receiving a single binary signal.

The input circuit 200 has an input terminal 201 to which a first binary signal SA is applied by means of a reader 150, and it produces a write control signal WR at an output terminal 207 to control a memory 140. The input circuit 200 has a first comparator 115, a control circuit 220, an inhibition circuit 240 and a protection device formed of, for example, a parallel resistor ra having one terminal connected to the input terminal 201 and its other terminal connected to the ground of the circuit.

The first comparator 115 is identical to the comparator of FIG. 1. Its positive input terminal is connected to the input terminal 201 to receive the binary signal SA, and the first reference voltage V1 is applied to its negative input terminal. The comparator 115 produces a signal $WR_0$ that is active, for example equal to "1", if the level of the first binary signal SA is higher than the first reference voltage V1. If not, it is inactive, for example equal to "0".

The control circuit 220 has two input terminals connected respectively to the input terminal 201 and the output terminal of the comparator 115. At an output terminal, the control circuit produces a validation signal VAL having the following characteristics. If the voltage level of the binary signal SA is higher than the reference voltage V1 or lower than a second reference voltage V2, then the validation signal VAL is active and it is for example in a logic state equal to "1". If not, namely if the voltage level of the first binary signal SA ranges between the first and second reference voltages V1, V2, then the validation signal VA is inactive. It is, for example, in a second logic state equal to "0", and it is kept inactive until the reinitializing of the control circuit 220.

Preferably, the first and second reference voltages are chosen so as to be close to the voltage threshold VH and VL, for example V1 between 0.8 and 2 V and V2 in the range of 0.8 V. Thus, the validation signal VAL will be inactive in the uncertainty zone of operation of the comparator 115 or if there is a doubt about the voltage level of the signal SA really received on the input terminal 201 of the input circuit 200. The inhibition circuit 240 receives the signal $WR_0$ and the validation signal VAL and produces a write control signal WR having the following characteristics. If the validation signal VAL is active, then the write control signal WR is equal to the signal $WR_0$. Conversely, if the validation signal VAL is inactive, the write control signal WR is kept inactive, for example in a logic state equal to "0".

It must be noted that, in the case of a prior art input circuit which, however, receives a single binary signal SA and produces a single control signal $WR_0$, the assembly formed of the first and second read circuits 110, 120 and the decoding circuit 130 may be limited to a single comparator 115. Indeed, if only one signal SA is received by the input circuit, the second read circuit 120 becomes unnecessary and may be eliminated, as also the decoding circuit 130. The control signal $WR_0$ in this case is equal to the binary data element A produced by the first read circuit 110. Furthermore, the flip-flop circuit 116 is not indispensable and may be eliminated since there is no more than one binary signal SA to be synchronized with itself.

The assembly formed by the first and second read circuits 110, 120 and the decoding circuit 130 can therefore be limited to a comparator 115 if we are considering a smart card that receives instructions in the form of a single binary signal SA.

To obtain a more complete description of the working of the input circuit 200 of FIG. 2, it is necessary to describe the consequences of poor contact between the reader 150 and the smart card. A contact between an output terminal 151 of the reader and a corresponding input terminal 201 of the card may be represented in a model comprising a series resistor R as shown in dashes in FIG. 2. Owing to the presence of the parallel resistor $r_a$, a voltage divider bridge is set up between the resistors R and $r_a$.

For example, if a write operation in the memory is envisaged, it is sought to obtain a write control signal WR that is active at output of the input circuit 200. For this purpose, a voltage equal to the supply voltage Vcc of the circuit (not shown in FIG. 2) is applied to the output terminal 151 of the reader. The binary signal SA on the corresponding input terminal 201 of the card is then at a voltage level equal to $Vcc*r_a/(R+r_a)$. If the contact is a good quality contact, the resistor R has a value of zero and the binary signal SA is at a voltage level equal to Vcc; the first comparator 115 gives the desired signal, namely $WR_0=1$. Furthermore, since the voltage level of the signal SA is higher than the first reference voltage V1, the validation signal VAL produced by the control circuit is active, the write control signal WR is therefore equal to $WR_0$; a write operation can then be performed if WR=1.

If the contact between the output terminal 151 of the reader and the corresponding input terminal 201 of the card is a poor quality contact, the resistor R may attain a value such that, when a voltage equal to the supply voltage Vcc is applied to the output terminal 151 of the reader, the signal SA that appears at the input terminal 101 is a voltage level between the first and second reference voltages V1, V2; the first comparator 115 gives $Wr_0=0$ whereas it was desired to obtain $WR_0=1$.

At the same time, since the voltage level of the signal SA ranges between the first and second reference voltages V1, V2, the control circuit gives an inactive validation signal VAL, and the write control signal WR produced by the inhibition circuit 240 is now inactive and equal to "0". Thus, whatever may be the signal $WR_0$, the write control signal WR is kept inactive when the voltage level of the signal SA is between the first and the second reference voltages V1, V2. The card is therefore off since no deliberate or involuntary programming of the memory is possible any more. The risk of invalidation of the card in the event of poor contact is eliminated.

The principle of the invention has been described in the case where the protection device consists of a parallel resistor ra connected between the input terminal 201 and the ground. However, the invention may also be used if the protection device consists of a resistor $r_b$ (shown in dashes in FIG. 2) comprising a terminal connected to the input terminal 201 and another terminal to which there is applied the supply voltage Vcc. Simply, in this case the first reference voltage V1 will be chosen to be smaller than the second reference voltage V2, for example with V1 in the range of 0.8 V and V2 in the range of 2 V.

If no operation of writing in the memory is envisaged, it is desired to obtain a write control signal WR that is inactive at output of the input circuit 200. For this purpose, a zero voltage is applied to the output terminal 151 of the reader. The binary signal SA at the input terminal 201 of the card is then at a voltage level equal to $Vcc*R/(R+r_b)$ If the contact between the reader and the card is a good quality contact, then the resistor R is at zero and the signal SA is also zero. The first comparator gives the desired control signal, namely WR=0. Conversely, if the contact between the card and the reader is of poor quality, the resistor R may take a value such that the voltage level of the signal SA ranges from the first to the second reference voltages. The first comparator then gives $WR_0=1$ whereas it was sought to obtain $WR_0=0$. However, the control circuit produces an inactive signal VAL and the write control signal WR is kept inactive. The card is therefore off and no involuntary programming of the card is possible any more.

The invention can also be implemented in input circuits of greater complexity such as the circuit of FIG. 1 for example.

The diagram of FIG. 3 has been modified with respect to that of FIG. 1 as follows. A control circuit 220 and an inhibition circuit 240 have been added. The control circuit 220 comprises a comparator 222, two logic gates 224, 225 and a flip-flop circuit 226. The comparator 222 is identical to the comparator 115; its positive input terminal (+) input terminal is connected to the input terminal 101 and the second voltage reference V2 is applied to its negative (−) input terminal. The comparator 222 gives a binary data element C equal to "1" if the voltage level of the first binary signal SA is higher than the second reference voltage V2. If not it is equal to "0". The logic gate 224 is for example an XNOR type gate and has two input terminals connected respectively to the output terminals of the comparators 115 and 222. The logic gate 225 is preferably an AND type gate and has two input terminals and one output terminal.

The flip-flop circuit 226 has a D data input terminal, a clock input terminal CK and a non-inverting initializing terminal connected respectively to the output terminal of the logic gate 225 and the input terminals 102 and 105 of the input circuit 200. The flip-flop circuit 226 also has an output terminal connected to the output terminal of the control circuit 220 to give the validation signal VAL and, secondly, an input of the logic gate 225 whose other input is connected to an output terminal of the logic gate 224. The flip-flop circuit 226 is not indispensable to the implementation of the invention and could be eliminated. It simply improves the overall functioning of the circuit by synchronizing the validation signal VAL and the binary data elements A and B to be transmitted to the decoding circuit 130 on one and the same clock signal CLK.

Figure 3:
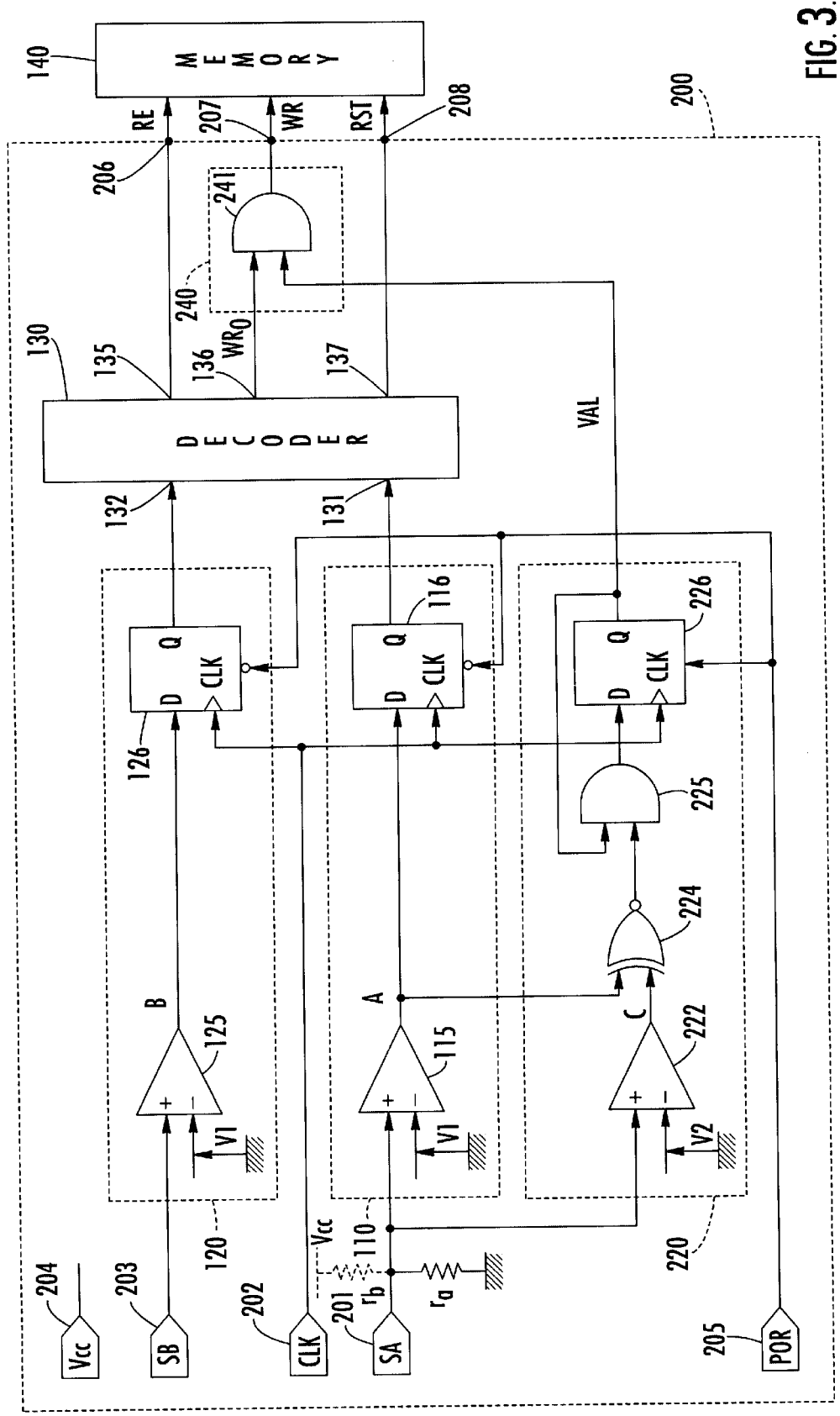
FIG. 3 is a schematic diagram of an input circuit of a memory integrated circuit card implementing the invention.

The inhibition circuit 240 of FIG. 3 comprises a logic gate 241, for example an AND type logic gate, having two input terminals connected respectively to the output terminal 136 of the decoding circuit to receive the control signal $WR_0$ and to the Q output terminal of the flip-flop circuit 226 to receive the validation signal VAL. The logic gate 241 also has an output terminal connected to the output terminal 207 of the input circuit 200 to give the write control signal WR such that:

$WR=WR_0$ if VAL=1
WR=0 if VAL=0

The AND gate 241 is only an exemplary embodiment of the inhibition circuit of the invention, the essential point being the making of a circuit that keeps the write control signal WR in an inactive state when the validation signal is inactive. For example, it is also possible to use an inhibition circuit comprising a selection switch circuit that switches over the write control signal WR between the signal $WR_0$ and an identically zero signal.

The overall operation of the input circuit 200 of FIG. 3 is as follows. When the card is inserted into the reader and powered, the signal POR initializes the flip-flop circuits 116, 126 and 226. The validation signal VAL is activated: VAL=1. The decoding circuit 130 receives logic "0s" at its input terminals 131 and 132 and produces signals RE=0, RST=1 and $WR_0=0$. Thus, the signal WR is at zero. When an instruction is sent to the card by the reader, the input circuit 200 receives the binary signals SA, SB. The first and second read circuits 110, 120 give binary data elements A and B representing the logic state of the binary signals SA, SB. The decoding circuit 130 gives the corresponding signals RE, WRO and RST.

At the same time, if the voltage level of the binary signal SA is higher than the first reference voltage V1 or lower than the second reference voltage V2, the comparator 115 of the first read circuit 110 and the comparator 222 of the control circuit 220 give the same result and the logic gate 224 produces an active signal equal to "1". The gate 225 receives two active signals at its two input terminals and produces an active validation signal VAL at the D input terminal of the flip-flop circuit 226. During an active edge of the clock signal CLK, the flip-flop circuit 226 sends the validation signal VAL to the output terminal of the control circuit.

The inhibition circuit 240 then gives a write control signal WR equal to the control signal $WR_0$. If, on the contrary, the voltage level of the signal SA is lower than the first reference voltage V1 and higher than the second reference voltage V2, the comparators 115 and 222 give different results. It is estimated in this case that the signal SA cannot be accurately read and interpreted by the input circuit inasmuch as there may be a doubt about the voltage level of the signal SA received at the input terminal 201 and the logic gate 224 gives an inactive signal. Since the gate 225 receives an inactive signal on at least one of its inputs, it gives an active validation signal VAL at the D input terminal of the flip-flop circuit 226. During an active edge of the clock signal CLK, the flip-flop circuit 226 transfers the inactive validation signal VAL to the output terminal of the control circuit. The inhibition circuit 240 then gives a write control signal WR equal to "0": the write control is thus inhibited.

If thereafter the voltage level of the signal SA again becomes higher than V1 or lower than V2, the comparator 115 of the first read circuit 110 and the comparator 222 of the control circuit 220 give the same result and the logic gate 224 produces an active signal equal to "1". Since the validation signal VAL has been previously inactive, one of the input terminals of the gate 225 receives an inactive signal and the gate produces an inactive signal VAL at the D input terminal of the flip-flop circuit 226. The validation signal VAL is thus kept inactive, and there is no longer any write operation possible even if the voltage level of the signal SA returns to an appropriate value, close to zero or close to Vcc. The validation signal VAL must be reinitialized, in this example by a power-on signal POR, so that the card can be used again.

In the exemplary embodiment of the invention here above, the control circuit 220 and the inhibition circuit are used to control the voltage level of the signal SA and inhibit the write control signal WR if the protection device should be constituted by a parallel resistor $r_a$ connected between the input terminal 201 and the ground.

However, the invention can also be implemented if the protection device includes a resistor $r_b$ (shown in dashes in FIG. 2) comprising a terminal connected to the input terminal 201 and another terminal to which the power supply voltage Vcc is applied. In this case, the control circuit and the inhibition circuit of the invention are identical to those of the above example. Simply, the first reference voltage V1 will preferably be chosen so as to be below the second reference voltage V2. For example V1 will be in the range of 0.8 V and V2 in the range of 2 V.

Similarly, the control circuit 220 and the inhibition circuit 240 of the invention may be used to control the voltage level of the signal SB. It is also possible to use a simplified control circuit comprising simply a comparator identical to the comparators 115, 125 or 222 to ascertain the voltage level on every other input terminal of the card.

Figure 4:
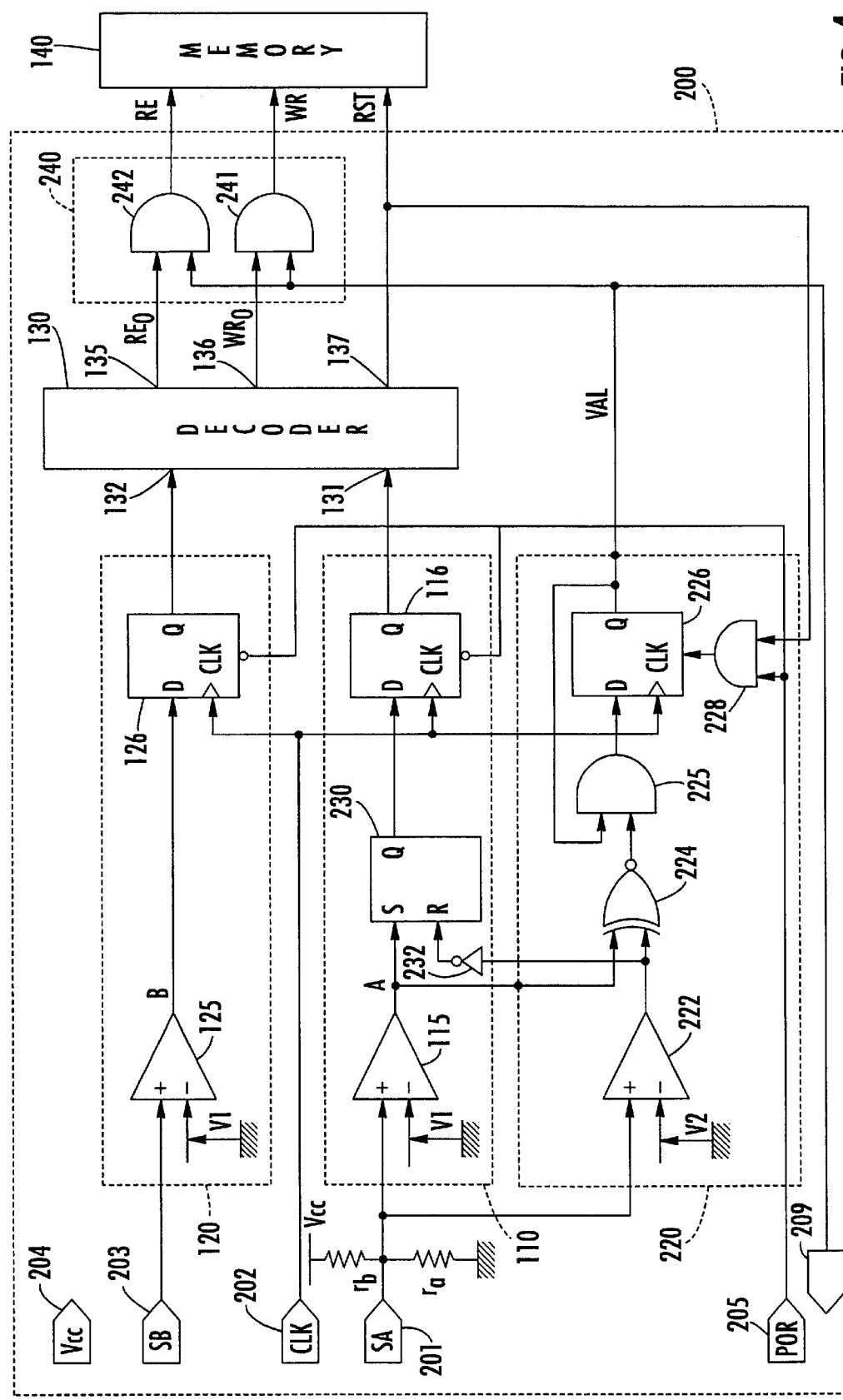
FIG. 4 is a schematic diagram of an input circuit illustrating possible variations of the circuit of FIG. 3.

FIG. 4 is a schematic diagram of an input circuit 200 illustrating possible variations of the invention. Each of these improvements may be used separately or with others, without modifying the basic operation of the invention. A first variation of the invention is obtained by using a protection device comprising a resistor $r_a$ and a resistor $r_b$. The resistor $r_a$ is connected between the input terminal 201 and the ground and the resistor $r_b$ is connected between the input terminal 201 and the power supply input terminal 205. The values of the resistors $r_a$ and $r_b$ are preferably chosen so that, when the input terminal 201 is left floating, the voltage at the input terminal 201 is between the first and second reference voltages V1, V2. With a protection device such as this, the control circuit gives an inactive validation signal when the card is unused and no write operation in the memory can be performed.

In practice, the resistors $r_a$, $r_b$ are made by means of highly resistive transistors that very slightly bias the input terminal 201. This means that very little current flows in the resistors $r_a$, $r_b$ when the input terminal 201 is left floating. Conversely, when the card is inserted into the reader, the reader dictates a current and a voltage at the terminal 201 that have values sufficient to eliminate the effect of the resistors $r_a$, $r_b$. The resistors $r_a$, $r_b$ therefore do not modify the normal working of the input circuit 200 when the card is inserted into the reader.

Another variation of the invention includes the addition, to the input circuit 200, of an output terminal 209 connected to the Q output terminal of the flip-flop circuit 226. The reader is thus immediately informed if there is any doubt about the level of the signal SA. It is also possible to add a logic gate 228 to the control circuit 220. This logic gate 228 will have two input terminals respectively connected to the input terminal 105 to receive the power-on signal POR and to the output terminal 136 of the decoding circuit 130 to receive the initialization control signal RST. The gate 228 also has an output terminal connected to the initializing input terminal of the flip-flop circuit 226. The gate 228 is for example an OR type gate. It makes the validation signal VAL active, namely it places it at "1" either with the power-on signal POR or with the initialization signal RST. Thus, if the digit A is read accurately after a wrong reading, it is no longer necessary to completely reinitialize the input circuit by means of a POR signal. Thus, inter alia, the loss of the data contained in the flip-flop circuits other than the flip-flop circuit 226 of the input circuit is prevented.

The invention can also be improved by the addition, to the inhibition circuit 240, of a logic gate 242 comprising two input terminals and an output terminal. The logic gate 242 receives the read control signal RE at a first input terminal and the validation signal VAL at a second input terminal. The logic gate 242 thus enables the inhibiting of the memory shift and read commands RE.

The inhibition circuit 240 can also be used to inhibit the initialization signal RST, for example by adding an AND gate 243. However, this improvement cannot be implemented if the control circuit 220 comprises the logic gate 228. Indeed, if the signal RST is kept inactive by the inhibition circuit 240, it cannot be used as an initializing signal for the control circuit 220.

Another possible variation of the invention includes the addition of a flip-flop circuit 230 and an inverter 232 to the read circuit 110. The flip-flop circuit 230 for example has a non-synchronized bistable storage structure and is commonly known as an RS type flip-flop circuit. It has two input terminals R and S respectively connected to the output terminal of the comparator 222 by means of the inverter 232 and to the output terminal of the comparator 115. Finally, the flip-flop circuit 230 has a Q output terminal connected to the D input terminal of the flip-flop circuit 116. The assembly comprising the comparators 115, 222, the flip-flop circuit 230 and the inverter 232 form a circuit equivalent to a hysteresis comparator, commonly called a Schmit trigger which works as follows. Initially, it is assumed that the level of the signal SA is lower than the reference voltages V1 and V2 applied to the negative input terminals of the comparators 115 and 222. Thus, the comparators 115 and 222 give a "0" at their output terminal, the flip-flop circuit 230 respectively receives a "0" and a logic "1" at its input terminals S and R, and therefore gives a logic "0" at its Q output terminal. It will also be assumed that the reference voltage V1 is higher than the reference voltage V2.

If the voltage level of the signal SA increases and goes beyond the second reference voltage V2, the output of the comparator 222 goes to "1" and the output of the comparator 115 remains at "0". The input terminal R of the flip-flop circuit 230 changes its state but its Q output terminal remains at "0". If the voltage level of the signal SA increases further and goes beyond the first reference voltage V1, the output terminal of the comparator 115 changes its state along with the input terminal S of the flip-flop circuit 230. Consequently, its output terminal passes to "1".

What is claimed is:

1. An integrated circuit card comprising:

a write accessible memory; and an input circuit receiving a first binary signal transmitted by direct contact between the card and a reader and producing a write control signal that is dependent on a first data element to control the memory, the input circuit comprising a first comparator that receives the first binary signal and produces the first data element representing a voltage level of the first binary signal with respect to a first reference voltage, a control circuit that receives the first binary signal and produces a validation signal that is inactive if the voltage level of the first binary signal is between the first reference voltage and a second reference voltage that is below the first reference voltage, the validation signal being active if the level of the first binary signal is higher than the first reference voltage or if it is lower than the second reference voltage, and an inhibition circuit to inhibit the write control signal when the validation signal is inactive.

2. The integrated circuit card according to claim 1, wherein the first comparator comprises a positive input terminal to which the first binary signal is applied and a negative input terminal to which the first reference voltage is applied, the first comparator producing the first data element at an output terminal, the first data element being in a first logic state if the level of the first binary signal is higher than the first reference voltage and being in a second logic state if the level of the first binary signal is not higher than the first reference voltage; and wherein the control circuit comprises:

a second comparator comprising a positive input terminal to which the first binary signal is applied and a negative input terminal to which the second reference voltage is applied, the second comparator producing a second data element at an output terminal, the second data element being in the first logic state if the level of the first binary signal is higher than the second reference voltage and being in the second logic state if the level of the first binary signal is not higher than the second reference voltage; and a first logic gate comprising two input terminals connected respectively to the output terminals of the first and second comparators and an output terminal to produce the validation signal, the validation signal being active if the first and second data elements are in the same logic state, the validation signal being inactive if the first and second data elements are in different logic states.

3. The integrated circuit card according to claim 2, wherein the control circuit further comprises:

a flip-flop circuit to store and produce the validation signal when an active edge of a clock signal is received; and a second logic gate to keep the validation signal inactive.

4. The integrated circuit card according to claim 3, wherein the flip-flop circuit comprises a D input terminal connected to an output terminal of the second logic gate, a clock input terminal to which the clock signal is applied, an initialization input terminal and a Q output terminal to give the validation signal; and wherein the second logic gate has two input terminals respectively connected to the output terminal of the first logic gate and to the Q output terminal of the flip-flop circuit.

5. The integrated circuit card according to claim 2, wherein the input circuit also receives a second binary signal and produces a shift and read control signal and an initialization control signal, each depending on the first and second binary signals.

6. The integrated circuit card according to claim 5, wherein the control circuit comprises a third logic gate to make the validation signal active when a power-on signal is received or when the initialization control signal is produced by the input circuit, the third logic gate comprising two input terminals to which the power-on signal and the initialization control signal are applied respectively, and an output terminal connected to the initialization input terminal of the flip-flop circuit.

7. The integrated circuit card according to claim 5, wherein the inhibition circuit comprises a fourth logic gate comprising two input terminals to which there are respectively applied the write control signal and the validation signal, the fourth logic gate also comprising an output terminal to give either the write control signal if the validation signal is active or a zero control signal if the validation signal is inactive.

8. The integrated circuit card according to claim 7, wherein the inhibition circuit further comprises a fifth logic gate comprising two input terminals to which there are respectively applied the shift and read control signal and the validation signal, the fifth logic gate also comprising an output terminal to give either the shift and read control signal if the validation signal is active or a zero control signal if the validation signal is inactive.

9. The integrated circuit card according to claim 1, further comprising an output terminal to output the validation signal to the reader of the card.

10. The integrated circuit card according to claim 1, further comprising:

an input terminal for receiving the first binary input signal;

a supply input terminal for receiving a voltage supply signal; and a protection device comprising a first resistor and a second resistor, the first resistor being connected between the input terminal and ground, the second resistor being connected between the input terminal the supply input terminal.

11. An integrated circuit comprising:

a write accessible memory; and an input circuit for receiving a first binary signal and producing a write control signal that is dependent on a first data element to control the memory, the input circuit comprising a first comparator for receiving the first binary signal and producing the first data element representing a voltage level of the first binary signal with respect to a first reference voltages a control circuit for receiving the first binary signal and producing a validation signal that is inactive if the voltage level of the first binary signal voltage is between the first reference voltage and a second reference voltage that is below the first reference voltage, and active otherwise, and an inhibition circuit for inhibiting the write control signal when the validation signal is inactive.

12. The integrated circuit according to claim 11, wherein the validation signal is active if the voltage level of the first binary signal is higher than the first reference voltage or if it is lower than the second reference voltage.

13. The integrated circuit according to claim 12, wherein the first comparator comprises a positive input terminal to which the first binary signal is applied and a negative input terminal to which the first reference voltage is applied, the first comparator producing the first data element at an output terminal, the first data element being in a first logic state if the level of the first binary signal is higher than the first reference voltage and being in a second logic state if the level of the first binary signal is not higher than the first reference voltage; and wherein the control circuit comprises;

a second comparator comprising a positive input terminal to which the first binary signal is applied and a negative input terminal to which the second reference voltage is applied, the second comparator giving a second data element at an output terminal, the second data element being in the first logic state if the level of the first binary signal is higher than the second reference voltage and being in the second logic state if the level of the first binary signal is not higher than the second reference voltage; and a first logic gate comprising two input terminals connected respectively to the output terminals of the first and second comparators and an output terminal to produce the validation signal, the validation signal being active if the first and second data elements are in the same logic state, the validation signal being inactive if the first and second data elements are in different logic states.

14. The integrated circuit according to claim 13, wherein the control circuit further comprises:

a flip-flop circuit to store and produce the validation signal when an active edge of a clock signal is received; and a second logic gate to keep the validation signal inactive.

15. The integrated circuit according to claim 14, wherein the flip-flop circuit comprises a D input terminal connected to an output terminal of the second logic gate, a clock input terminal to which the clock signal is applied, an initialization input terminal and a Q output terminal to give the validation signal; and wherein the second logic gate has two input terminals respectively connected to the output terminal of the first logic gate and to the Q output terminal of the flip-flop circuit.

16. The integrated circuit according to claim 13, wherein the input circuit also receives a second binary signal and produces a shift and read control signal and an initialization control signal, each depending on the first and second binary signals.

17. The integrated circuit according to claim 16, wherein the control circuit comprises a third logic gate to make the validation signal active when a power-on signal is received or when the initialization control signal is produced by the input circuit, the third logic gate comprising two input terminals to which the power-on signal and the initialization control signal are applied respectively, and an output terminal connected to the initialization input terminal of the flip-flop circuit.

18. The integrated circuit according to claim 16, wherein the inhibition circuit comprises a fourth logic gate comprising two input terminals to which there are respectively applied the write control signal and the validation signal, the fourth logic gate also comprising an output terminal to give either the write control signal if the validation signal is active or a zero control signal if the validation signal is inactive.

19. The integrated circuit according to claim 18, wherein the inhibition circuit further comprises a fifth logic gate comprising two input terminals to which there are respectively applied the shift and read control signal and the validation signal the fifth logic gate also comprising an output terminal to give either the shift and read control signal if the validation signal is active or a zero control signal if the validation signal is inactive.

20. The integrated circuit according to claim 11, further comprising an output terminal for outputting the validation signal.

21. The integrated circuit according to claim 11, further comprising:

an input terminal for receiving the first binary input signal;

a supply input terminal for receiving a voltage supply signal; and a protection device comprising a first resistor and a second resistor, the first resistor being connected between the input terminal and ground, the second resistor being connected between the input terminal and the supply input terminal.

22. A method of accessing an integrated circuit comprising a write accessible memory, and an input circuit, the method comprising:

providing a first binary signal to the input circuit;

comparing the first binary signal with a first reference voltage to produce a first data element representing a voltage level of the first binary signal;

producing a validation signal that is active or inactive based upon the first data element and first reference voltage;

inhibiting the write control signal when the validation signal is inactive;

producing a write control signal when the validation signal is active.

23. The method according to claim 22, wherein the validation signal is active if the level of the first binary signal is higher than the first reference voltage or if it is lower than the second reference voltage.

24. The method according to claim 23, wherein the first binary data is in a first logic state if the level of the first binary signal is higher than the first reference voltage and in a second logic state if the level of the first binary signal is not higher than the first reference voltage; and wherein producing the validation signal comprises:

comparing the first binary signal with the second reference voltage;

generating a second data element which is in the first logic state if the level of the first binary signal is higher than the second reference voltage and in the second logic state if the level of the first binary signal is not higher than the second reference voltage; and combining the first and second data elements to produce the validation signal, the validation signal being active if the first and second data elements are in the same logic state, the validation signal being inactive if the first and second data elements are in different logic states.

25. The method according to claim 24, further comprising storing and producing the validation signal based upon an active edge of a clock signal.

26. The method according to claim 24, further comprising:

providing a second binary signal; and producing a shift and read control signal and an initialization control signal based upon on the first and second binary signals.

* * * * *